Oct. 5, 1965 P. N. ERICKSON ETAL 3,209,707
FREIGHT BRACING APPARATUS
Filed Nov. 15, 1960 12 Sheets-Sheet 1

INVENTORS.
Paul N. Erickson
John F. Moorhead
Henry L. Dunlap
BY James H. Lowing

Barnes, Kisby & Pierce
ATTORNEYS.

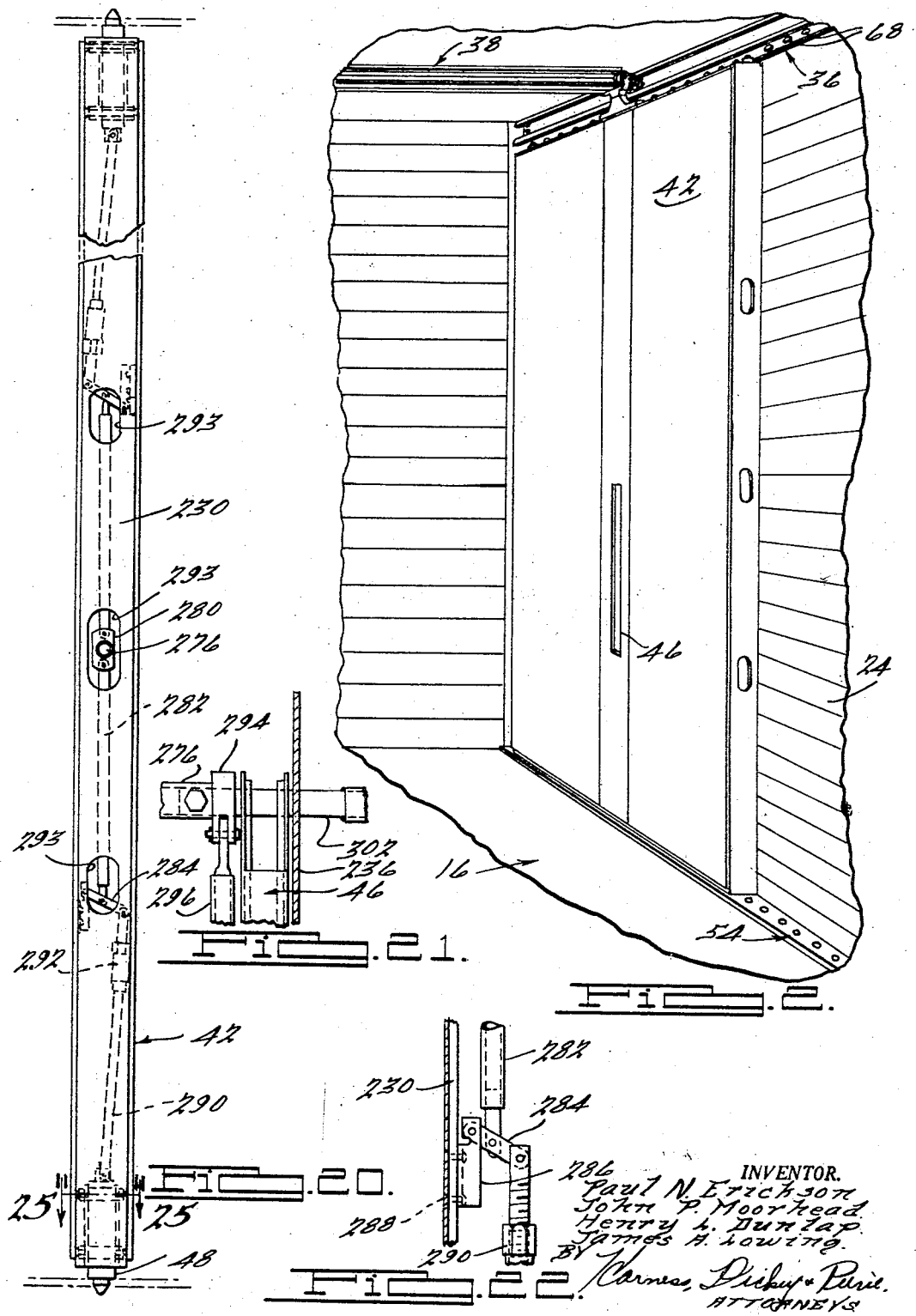

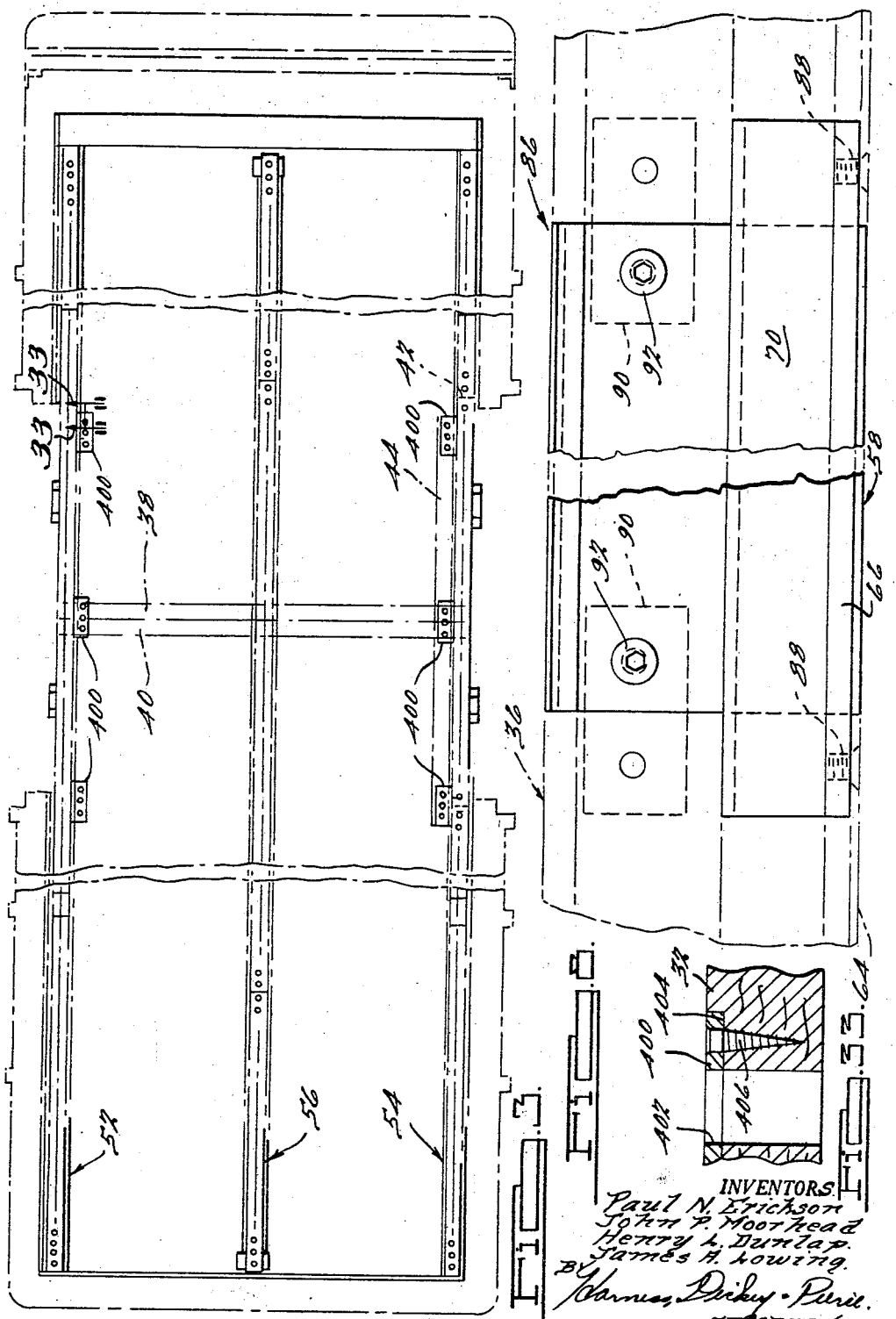

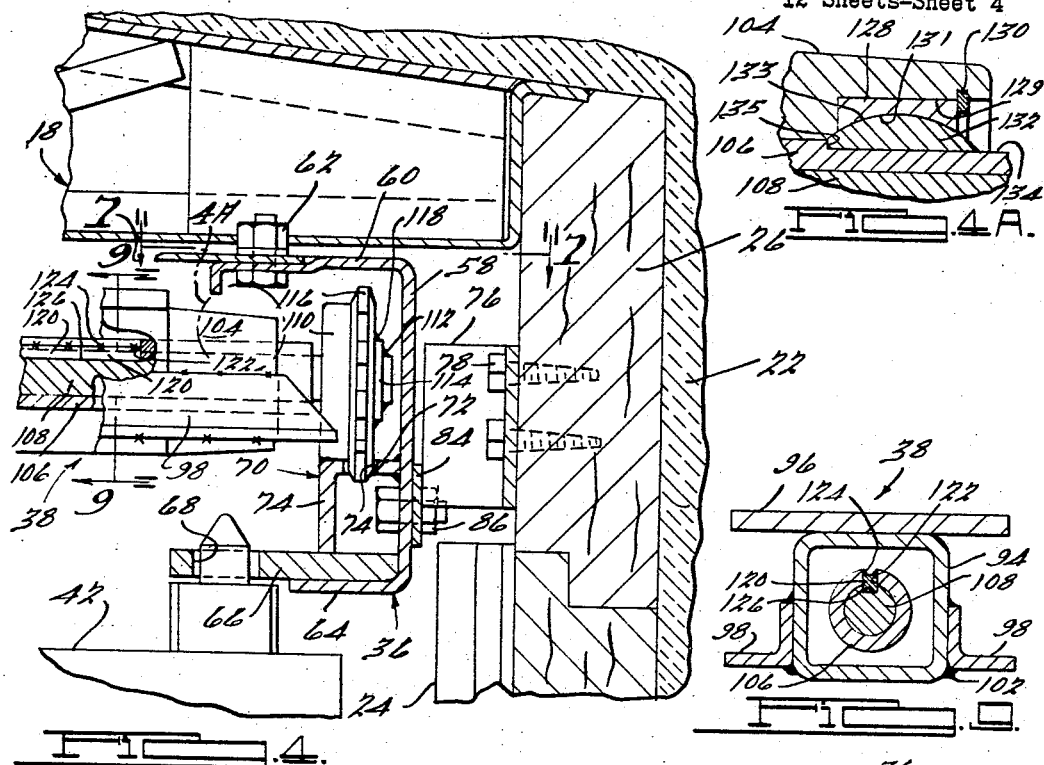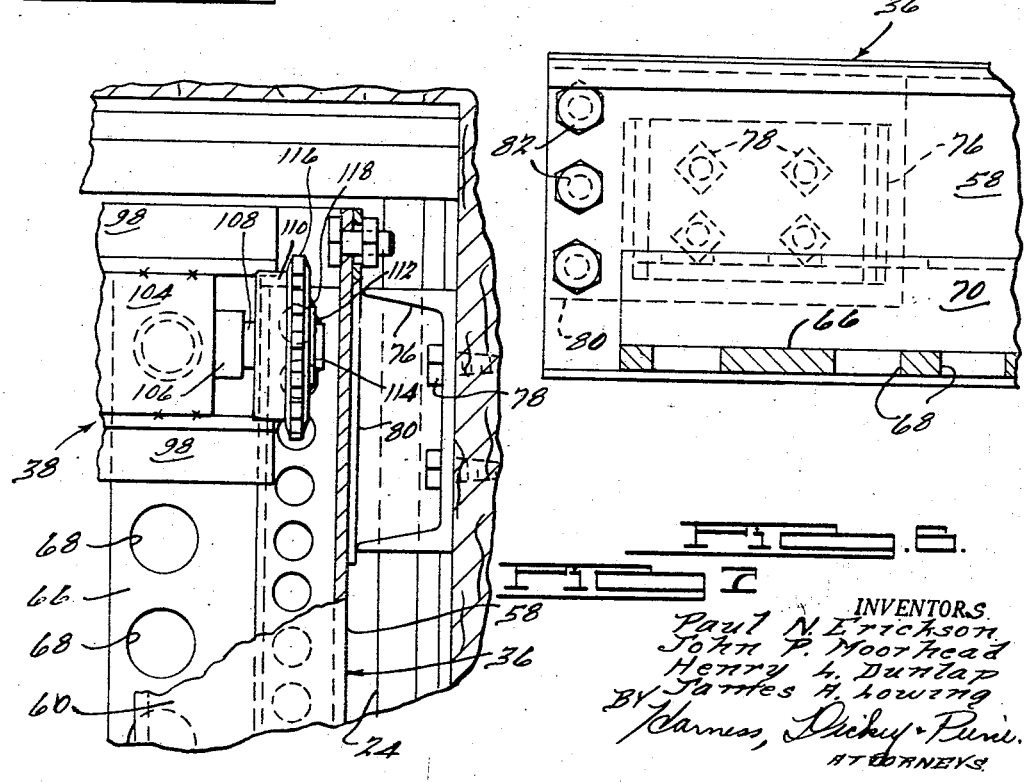

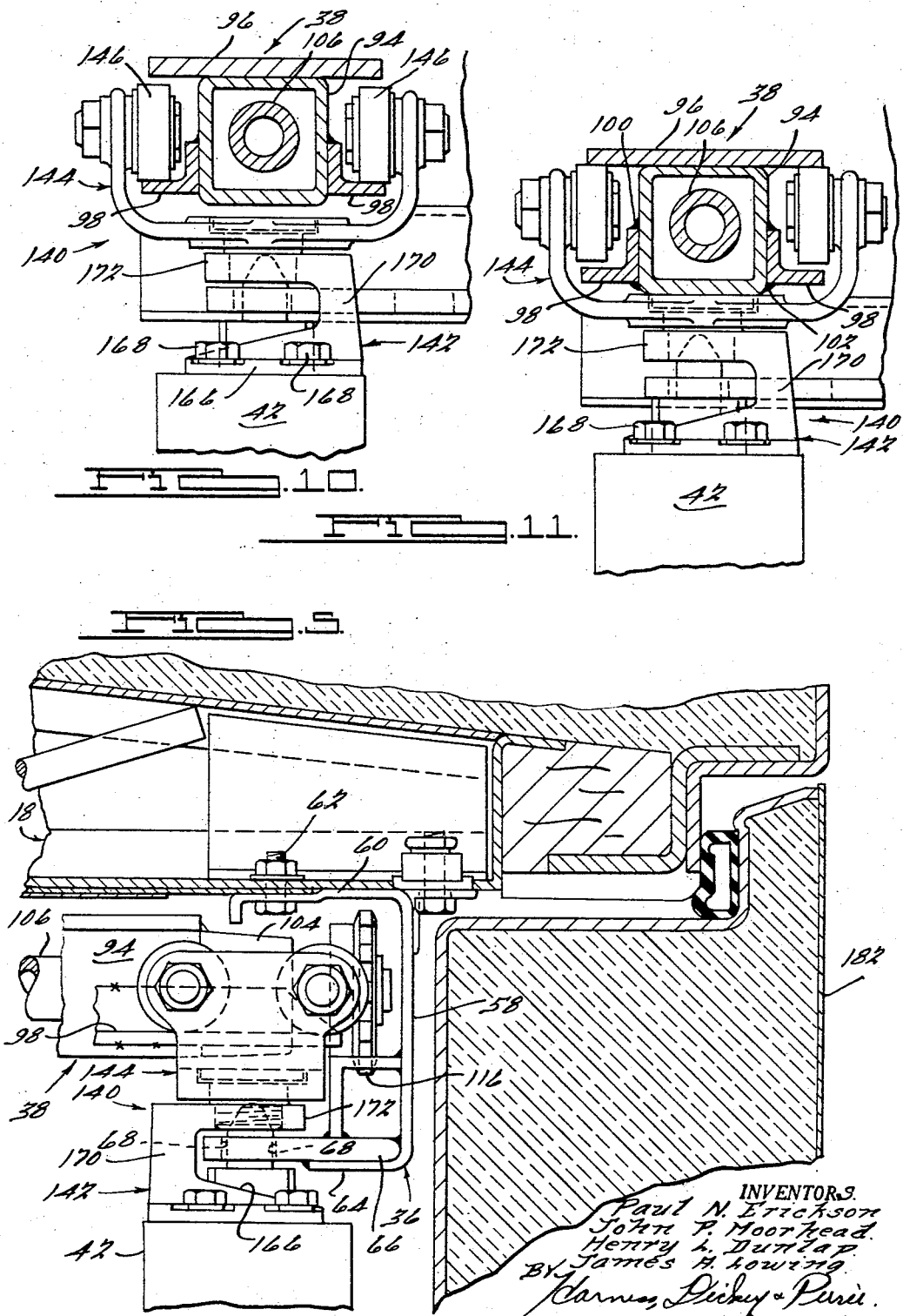

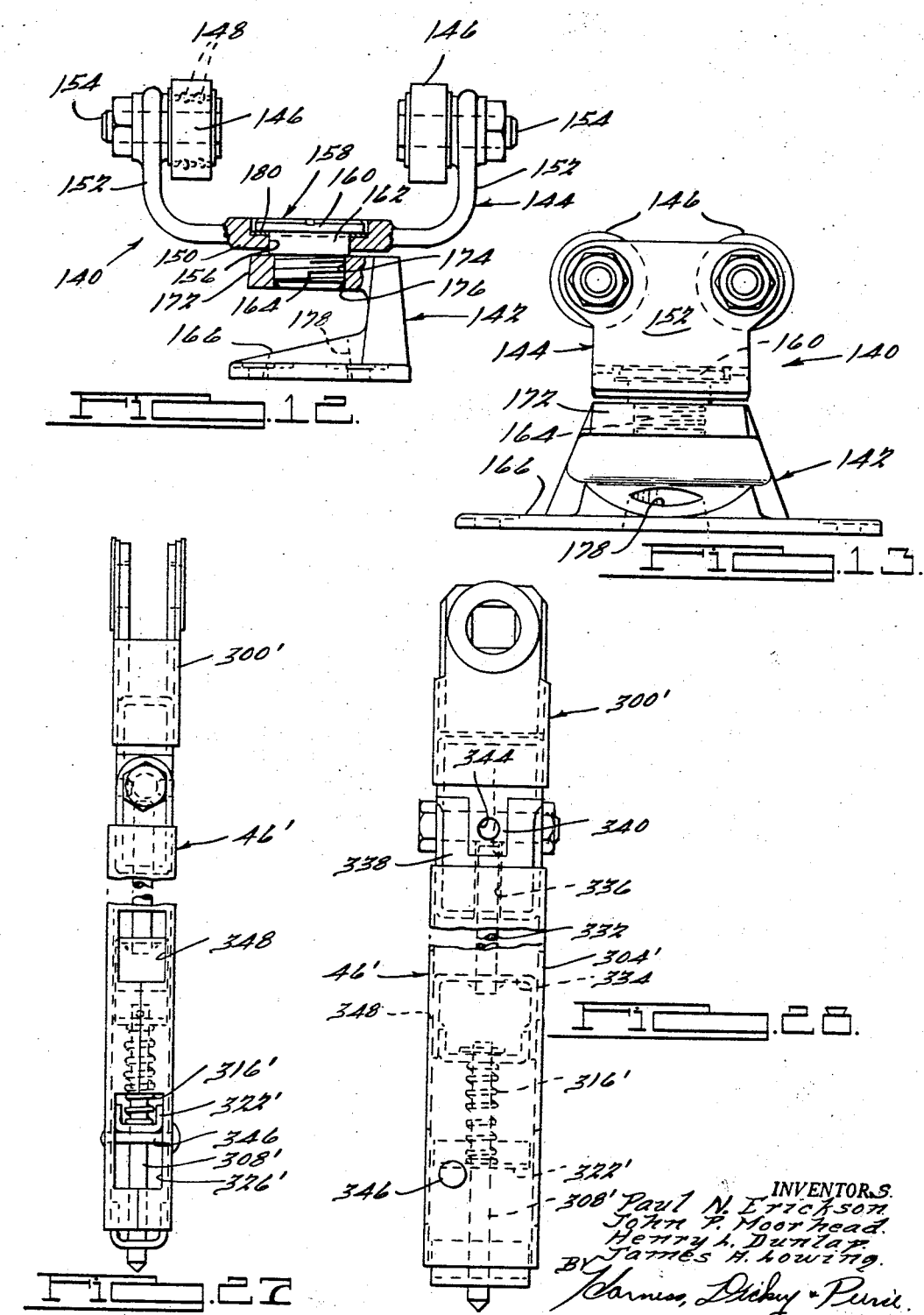

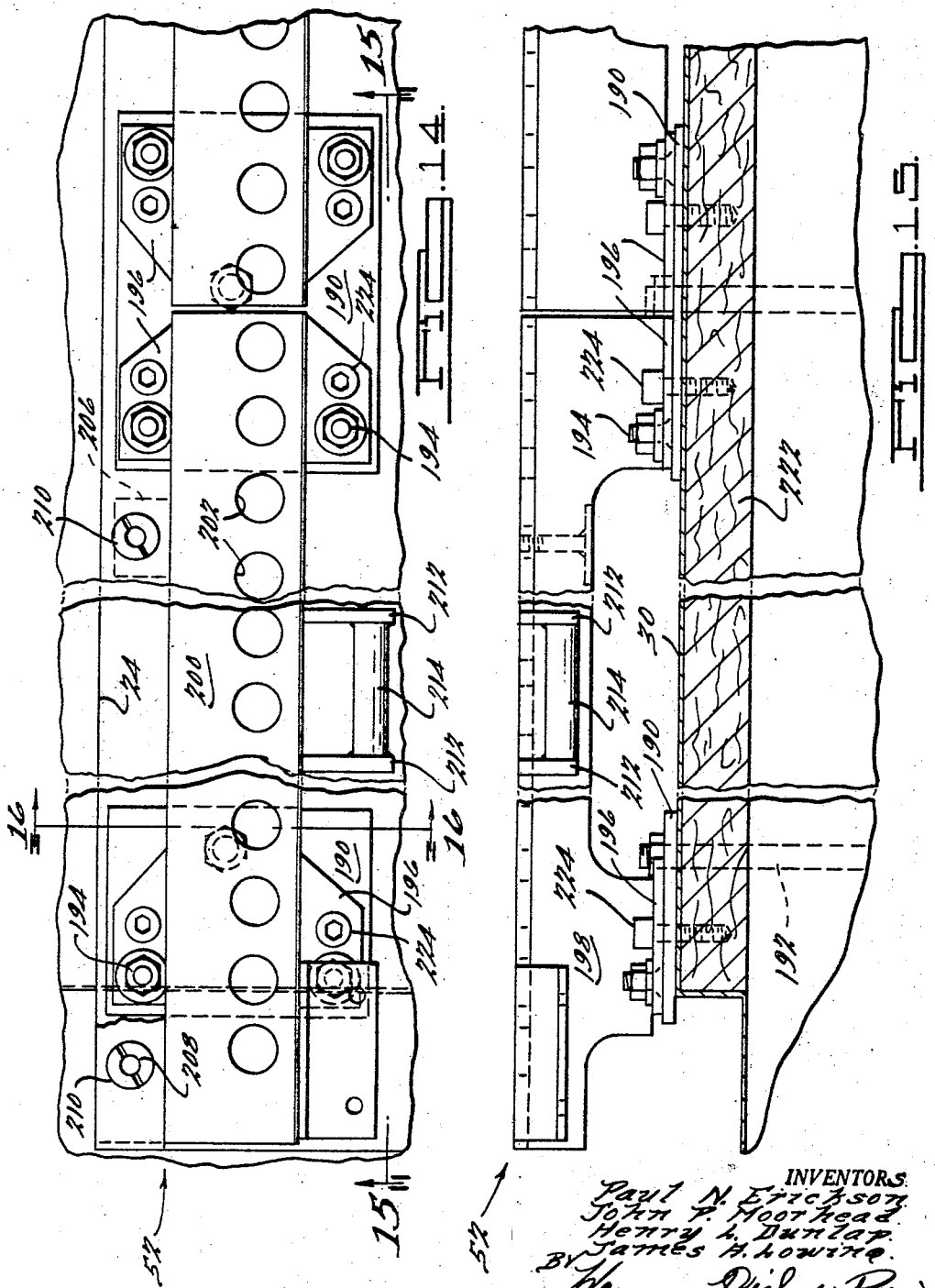

Oct. 5, 1965

P. N. ERICKSON ETAL 3,209,707

FREIGHT BRACING APPARATUS

Filed Nov. 15, 1960

INVENTORS.
Paul N. Erickson,
John P. Moorhead,
Henry L. Dunlap,
BY James H. Lowing
Harness, Dickey & Pierce
ATTORNEYS

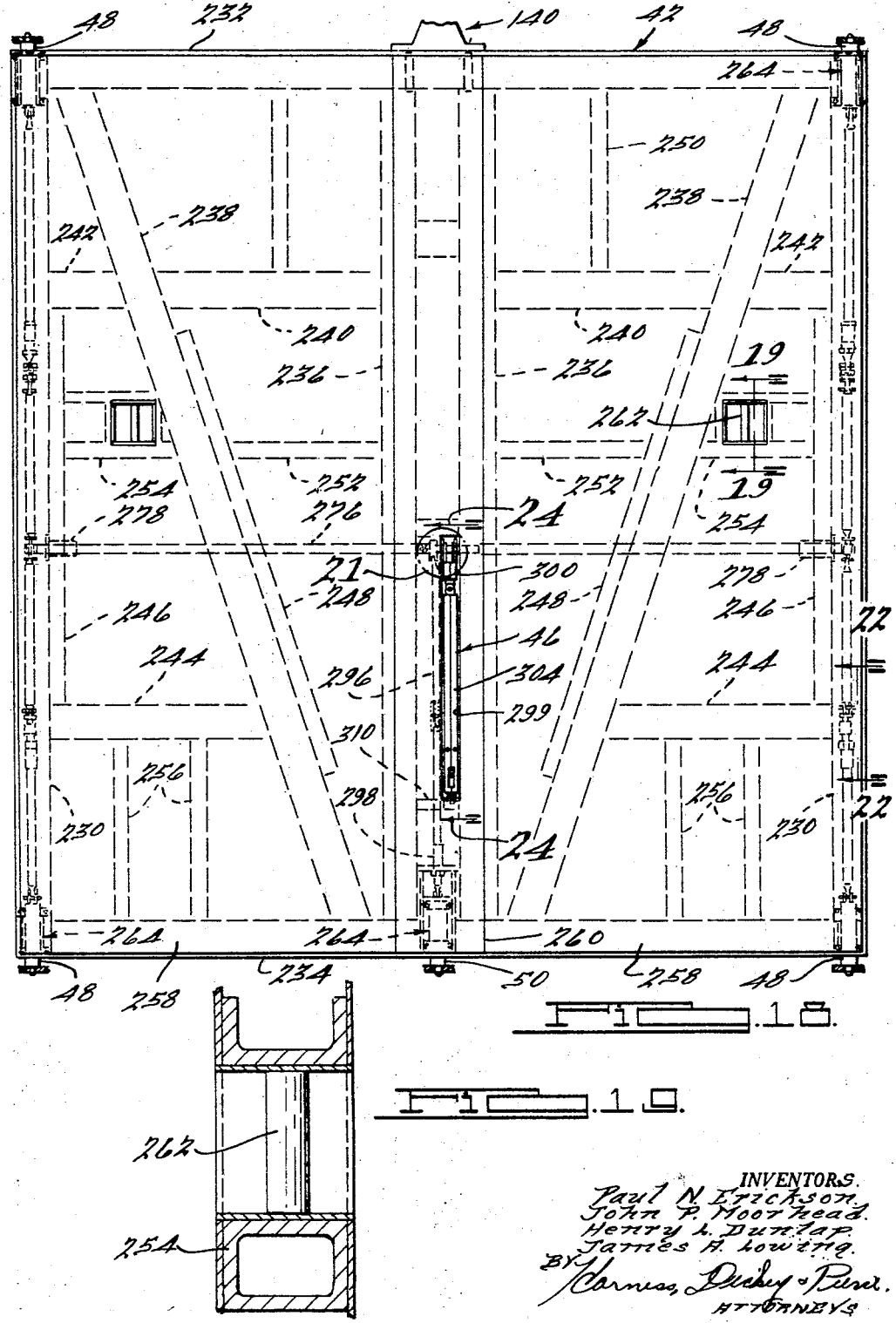

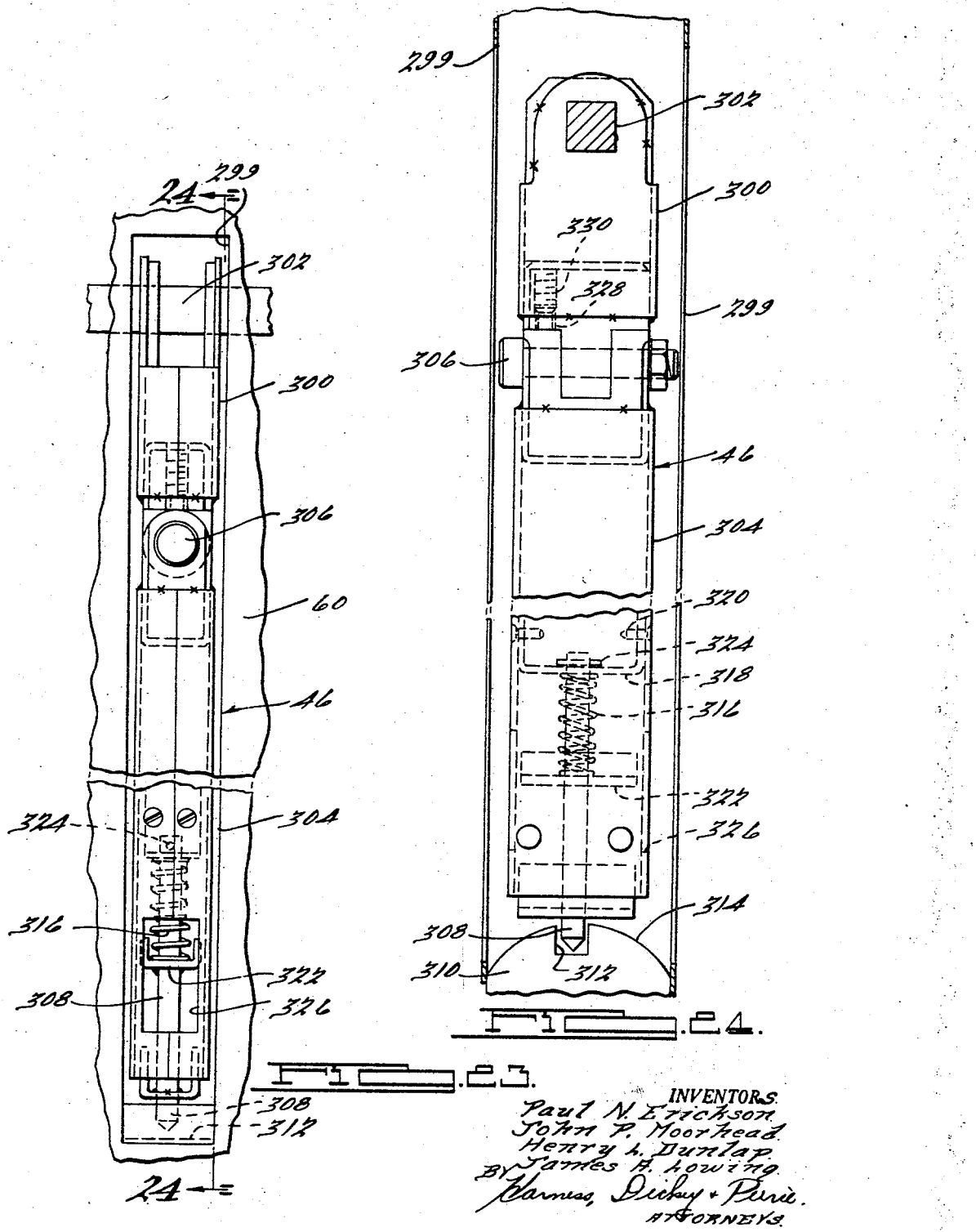

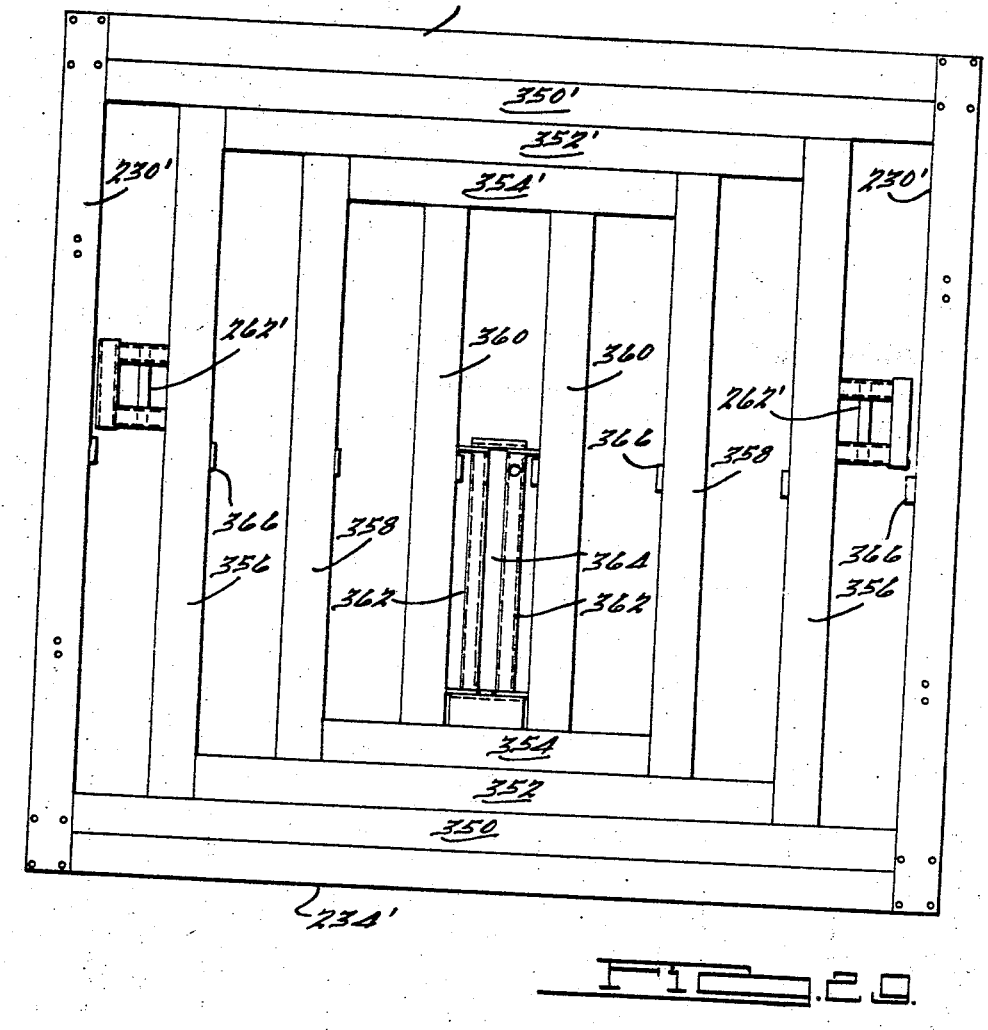

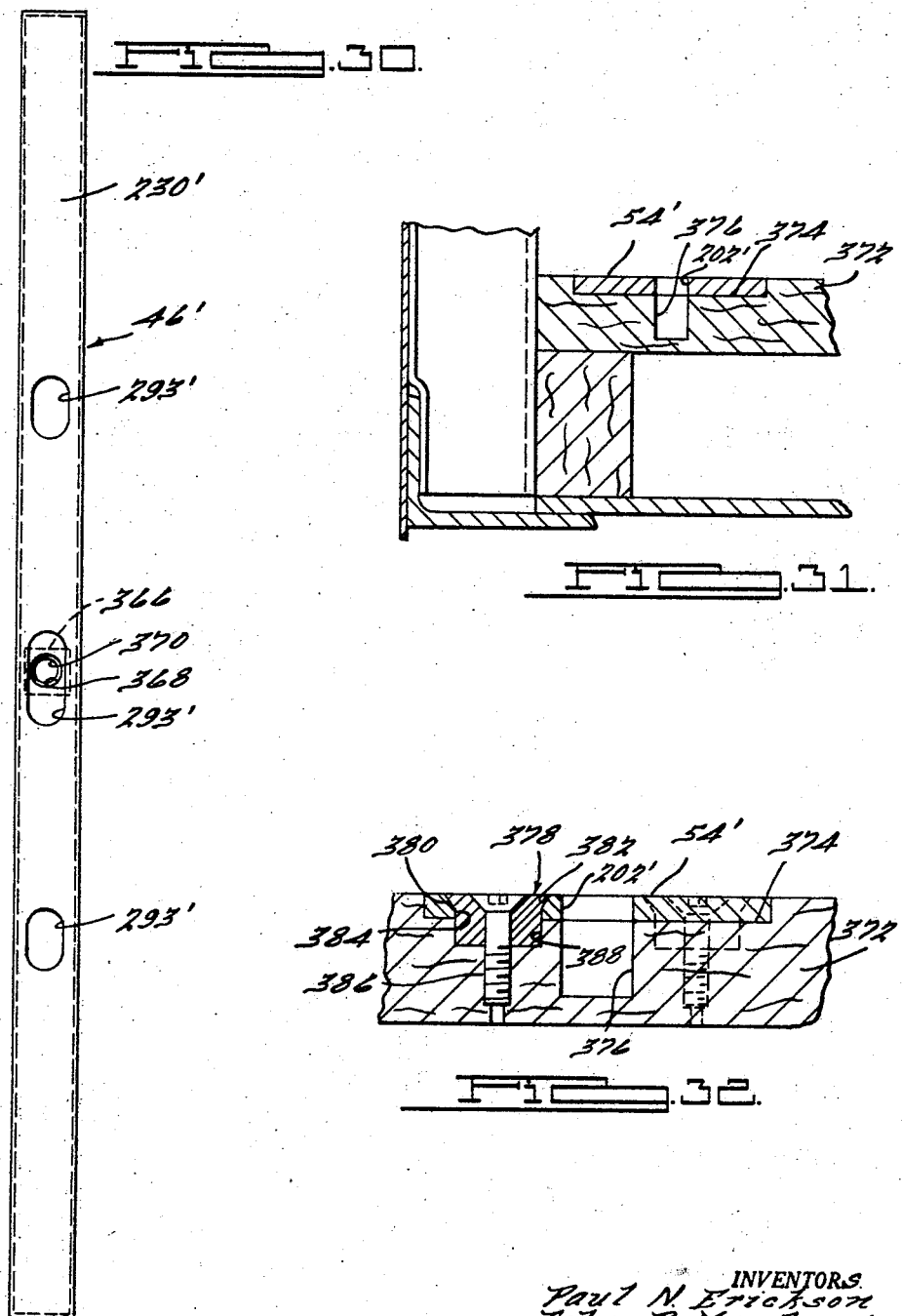

United States Patent Office 3,209,707
Patented Oct. 5, 1965

3,209,707
FREIGHT BRACING APPARATUS
Paul N. Erickson, Birmingham, John P. Moorhead, Plymouth, Henry L. Dunlap, Dearborn, and James A. Lowing, Plymouth, Mich., assignors to Evans Products Company, Plymouth, Mich., a corporation of Delaware
Filed Nov. 15, 1960, Ser. No. 69,351
8 Claims. (Cl. 105—376)

The present invention relates to apparatus for bracing freight in vehicles and is well adapted for use in the supporting and bracing of freight in railway boxcars, highway trucks, and the like. More particularly, the present invention relates to improved freight bracing apparatus of the type including movable bulkheads or partitions and means for supporting the bulkheads in an associated vehicle during movement between and for selectively securing the bulkhead in plurality of positions in the vehicle.

It is an object of the present invention to provide an improved freight bracing apparatus of the above mentioned type having an improved construction which is simple in design, economical of manufacture, and rugged, reliable and efficient in operation, and which greatly facilitates the loading of railway boxcars and the like.

More specifically, it is an object of the present invention to provide an improved freight bracing apparatus including an improved bulkhead, improved means for supporting the bulkhead for movement in the boxcar or other vehicle, and including improved means for securing the bulkhead in a plurality of positions within the vehicle.

It is also an object of the present invention to provide improved means for supporting the bulkhead on the rail members, enabling the bulkhead to be moved to positions in which it extends longitudinally of the vehicle and closely adjacent to a side wall or side wall door of the vehicle without interference between the rail members and means supporting the bulkhead on the rail members.

It is also an object of the present invention to provide an improved bulkhead construction which is light in weight, free of corrosion problems, and rugged in construction, such that it can withstand the severe shocks to which bulkheads of this type are subjected when used in railway boxcars and the like.

It is also an object of the present invention to provide an improved freight bracing apparatus of the above mentioned type in which the means for securing the bulkhead in place is actuated by a single handle, the operation of which also is effective during the movement thereof to the locked position to cause at least the major portion of the bulkhead weight to be supported on the floor of the vehicle to relieve the means supporting the bulkhead on the rail members.

It is also an object of the present invention to provide an improved freight bracing apparatus of the above mentioned type for use in a boxcar having doors in the opposite side walls thereof located generally centrally of the boxcar and including a pair of bulkheads adapted to support freight loaded in the opposite ends of the car in which both of the bulkheads may be secured in position parallel to and generally aligned with one of the doors so that both ends of the car may be loaded simultaneously.

Other and more detailed objects of the present invention will be apparent from a consideration of the following specification, the appended claims and the accompanying drawings wherein:

FIGURE 2 is a broken perspective view of the interior of a railroad refrigerator car showing the freight bracing apparatus illustrated in FIGURE 1 disposed with the bulkhead thereof parallel to and adjacent one side of the car;

FIGURE 3 is a broken and somewhat diagrammatic plan view of the floor of a railroad refrigerator car showing the side and end portions of the car in broken lines and representing diagrammatically in broken lines certain positions in which the bulkheads of the present freight bracing apparatus may be secured;

FIGURE 4 is an enlarged broken transverse sectional view of the portion of the structure shown in FIGURE 1 indicated by the circle 4;

FIGURE 4A is an enlarged broken sectional view of that portion of the structure illustrated in FIGURE 4 indicated by the circle 4A;

FIGURE 5 is an enlarged broken transverse sectional view similar to FIGURE 4 but illustrating the bulkhead disposed parallel to and closely adjacent the railroad refrigerator car door;

FIGURE 6 is enlarged broken longitudinal sectional view showing an end portion of the crane rail of the freight bracing apparatus of the present invention;

FIGURE 7 is a broken horizontal sectional view of the structure illustrated in FIGURE 4 taken substantially along the line 7—7 thereof and having parts broken away;

FIGURE 8 is a broken enlarged elevational view showing a portion of the crane rail of the freight bracing apparatus of the present invention;

FIGURE 9 is a sectional view of the structure illustrated in FIGURE 4 taken substantially along the line 9—9 thereof;

FIGURE 10 is a broken enlarged sectional view of the structure illustrated in FIGURE 1 taken substantially along the line 10—10 thereof;

FIGURE 11 is a broken sectional view similar to FIGURE 10 but showing the bulkhead raised to relieve the trolley beam of its weight;

FIGURE 12 is an elevational view, partially in section, of the carriage assembly employed in the present applicants' freight bracing apparatus for supporting the bulkhead on the trolley beam;

FIGURE 13 is an elevational view of the structure illustrated in FIGURE 12 as viewed from the left-hand side thereof;

FIGURE 14 is an enlarged broken plan view of one of the floor plate assemblies illustrated in FIGURE 1;

FIGURE 15 is a broken longitudinal sectional view of the structure illustrated in FIGURE 14 taken substantially along the line 15—15 thereof;

FIGURE 18 is an elevational view of the bulkhead illustrated in FIGURE 1;

FIGURE 19 is a sectional view of the structuure illustrated in FIGURE 18 taken substantially along the line 19—19 thereof;

FIGURE 20 is an elevation view of the bulkhead illustrated in FIGURE 18;

FIGURE 21 is an enlarged broken elevational view of the portion of the structure illustrated in FIGURE 18 indicated by the circle 21 with the outer facing sheet removed;

FIGURE 22 is a sectional view of the structure illustrated in FIGURE 18 taken substantially along the line 22—22 thereof;

FIGURE 23 is a broken enlarged elevational view showing the bulkhead handle construction illustrated in FIGURES 1 and 18;

FIGURE 24 is a sectional view of the structure illustrated in FIGURE 23 taken substantially along the line 24—24 thereof;

FIGURE 27 is a front elevational view of a bulkhead operating handle embodying a modified construction;

FIGURE 28 is a side elevational view of the handle illustrated in FIGURE 27;

FIGURE 29 is a front elevational view of a bulkhead frame structure embodying a modified construction;

FIGURE 30 is an edge elevational view of the bulkhead frame structure illustrated in FIGURE 29;

FIGURE 31 is a broken transverse sectional view showing a modified floor plate construction mounted in an insulated railroad car;

FIGURE 32 is an enlarged broken transverse sectional view similar to FIGURE 31 but taken along a line spaced longitudinally of the car from the plane of FIGURE 31 to show the fastening means; and, FIGURE 33 is an enlarged broken sectional view of the structure illustrated in FIGURE 3 taken substantially along the line 33—33 thereof.

While it will be readily appreciated by those skilled in the art that the improvements of the present invention may be readily embodied in a wide variety of freight storage and transporting equipment, they are, for illustrative purposes and not in a limiting sense, disclosed, in the preferred embodiment illustrated and described herein, as embodied in a railroad refrigerator car.

Figure 1:
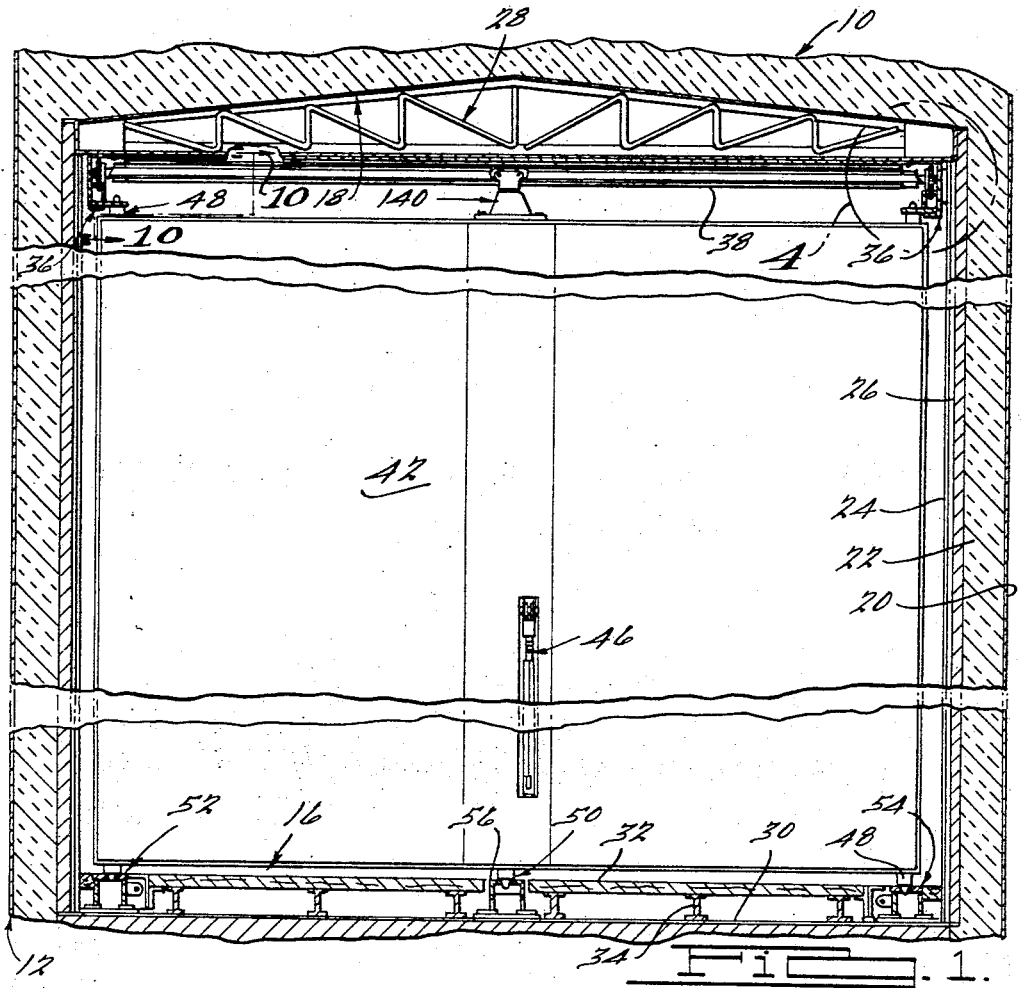
FIGURE 1 is a broken transverse sectional view of a railroad refrigerator car equipped with freight bracing apparatus embodying the present invention and showing the bulkhead thereof positioned against an end wall of the car.

Referring to the drawings, a railroad refrigerator car is generally indicated at 10 in FIGURE 1 and includes side walls 12 and 14, a floor 16 and roof structure 18. Each side wall includes an outer skin 20, suitable insulation 22, an inside lining 24 of wood (see FIGURE 2), and side frame structure 26 upon which are supported the ceiling trusses 28 of the roof structure. The floor 16 includes a floor sheet 30 and a raised rack floor 32 which is supported in the usual spaced relation thereabove on the longitudinally extending I-beams 34. The above mentioned elements of the refrigerator car 10 are of conventional construction and need not be described in detail here.

In the preferred form of the present invention illustrated and described herein, a pair of crane rails 36 are mounted on the side walls 12 and 14 adjacent the ceiling trusses 28 and extend longitudinally of the car. These crane rails 36 support a pair of trolley beams 38 and 40 which extend transversely of the car and are movable longitudinally of the car along the crane rails 36. The trolley beams 38 and 40 carry bulkheads 42 and 44, respectively. Each bulkhead is supported on its trolley beam as hereinafter described, for free movement therealong and for free pivotal movement relative thereto. Each bulkhead 42 carries a handle 46 operable for locking the bulkhead in desired adjusted positions and for unlocking it and assisting in moving it. To accomplish this locking in position, each bulkhead is provided with four corner pins 48, and in the preferred embodiment illustrated, with a center pin 50, all of which are operated by the handle 46. The floor 16 is provided with floor plates 52 and 54 extending longitudinally of the car adjacent opposite sides thereof and a central floor plate 56 which receive and co-operate with the lower bulkhead pins. The crane rails 36 receive and co-operate with the upper bulkhead pins.

The crane rails 36 are identical in construction and in their mounting in the car and accordingly, only one need be described in detail. As best illustrated in FIGURES 4 and 5, the crane rail 36, in the preferred embodiment illustrated, is of a fabricated construction and includes a channel 58 having an upper horizontal leg 60 which is secured as by bolts 62 to a portion of each of the ceiling trusses 18. Each channel 58 also has a shorter lower horizontal leg 64 which carries a relatively heavier plate 66 which is welded thereto. As is readily seen in FIGURES 4 and 5, the crane rail 36 is disposed with the channel 58 thereof opening toward the interior of the car and it will be seen that the heavy gauge plate 66 carried by the lower leg 64 of the channel extends substantially beyond the leg 64 and has a plurality of closely and uniformly spaced apertures 68 extending vertically through the portion thereof extending inwardly beyond the leg 64.

The third element of the fabricated crane rail 36 is an angle 70 having a horizontal leg 72 welded to the web of the channel 58 in spaced relation above the plate 66 and having a vertical leg 74 welded to the plate 66 in spaced relation to the web of the channel 58. The angle 70 co-operates with the plate 66 and the web of the channel 58 to provide a strong box section and the horizontal leg 72 thereof has closely and uniformly spaced small apertures 74 throughout its length providing a track for the trolley beam 38.

Support for the crane rail 36, in addition to that provided by the bolts 62, is provided both at the ends and at suitable intermediate points along its length. FIGURES 6 and 7 show the support at one end of one of the rails 36. A short channel section 76 extending vertically with its web engaging the side frame structure 26 above the inner wood lining 24, (see FIGURE 4) is secured thereto by a plurality of wood screws 78. A connector plate 80 extends across and is welded to the legs of the channel 76 and is secured to the back of the web of the channel 58 by bolts 82. Intermediate the ends of the crane rail 36 the support is also provided by channel sections 76 secured to the side frame structures 26 by screws 78 (see FIGURE 4) but at these points a smaller connector plate 84 is used which extends across and is welded to the legs of the channel section 76 below the screws 78 and is secured to the back side of the web of the channel 58 by bolts 86.

To facilitate removal of the trolley beam 38, the crane rail 36 at one or both sides of the car may be provided with a removable section such as the one shown in full lines in FIGURE 8 and generally indicated by the reference character 86. This removable section 86 has the plate 66 and angle 70 extending beyond both ends of the channel 58 and is secured in place by screws 88 extending through the lower leg 64 of the channel of the adjacent fixed sections of the crane rail 36 and threadedly engaging the plate 66. Additional support for the removable section 86 is provided by plates 90 welded or otherwise secured to the back of the web of the channels 58 of the adjacent fixed crane rail sections and extending behind the web of the channel 58 of the removable section 86. The removable section 86 is secured to the plates 90 by bolts 92.

The trolley beams 38 and 40 are identical in construction and accordingly, only the trolley beam 38 is illustrated and described in detail herein. The trolley beam 38, as is best illustrated in FIGURES 4, 4A, 5, 7, 9, 10 and 11, is fabricated of a plurality of elements including an elongated and generally square main frame in the form of a tube 94 which is reinforced by a top plate 96 extending along and welded to the top of the tube 94 and extends laterally outwardly beyond the tube 94 at each side, as clearly illustrated in FIGURES 10 and 11. The tube 94 also carries at opposite sides thereof, angles 98 welded thereto and providing roller tracks upon which the bulkhead 42 is supported during its movement along the trolley beam 38. The angles 98 are welded to the tube 94 as indicated at 100 and 102. At its opposite ends the tube 94 carries bearing castings 104 which rotatably support the opposite end portions of an elongated tubular shaft 106. The opposite ends of the tubular shaft 106 receive stub shafts 108, the outer end portions of which carry a hub member 110 welded thereto as indicated at 112 and which has a reduced outer end portion 114 upon which is received a sprocket wheel 116 which is welded thereto as indicated at 118. Each stub shaft 108 is connected to the tubular shaft 106 for rotation therewith by a key 120 (see FIGURE 4) which is received in a slot 122 in the tube 106 and welded to the tube as indicated at 124. As there shown, the stub shaft 108 is provided with a keyway 126 which receives the key 120. By virtue of this construction, it will be seen that the stub shaft 108, illustrated in FIGURES 4 and 7, and the sprocket wheel 116 carried thereby are secured to the tubular shaft 106 for rotation therewith while leaving this stub shaft 108 and its associated sprocket wheel 116 free to move axially relative to the tubular shaft 106. Preferably the corresponding stub shaft 108 (not shown) at the opposite end of the shaft 106 is pinned to the shaft 106 or otherwise secured against axial movement relative thereto.

As is clearly illustrated in FIGURE 4A, the shaft 106 has its end portion rotatably supported in the bearing casting 104 by a conventional self-centering bearing comprising an outer bearing element 128 received in an outer bore portion 129 of the bearing casting 104 and held in place by a snap ring 130. This outer bearing element 128 has a spherical inner surface 131 in which is seated an inner bearing element 132 having a spherical outer surface 133. It will also be noted that the shaft 106 has a reduced outer end portion 134 terminating at its inner end in an annular shoulder 135 which engages the inner bearing element 132. It will be appreciated that this construction both provides a self-centering bearing for the shaft 106 in the bearing castings 104 at the opposite ends of the trolley beam 38 and also serves to prevent movement of the bearing castings 104 and tube 94 upon which they are carried, axially relative to the tubular shaft 106.

The bulkhead 42 is supported on the trolley beam 38 for movement longitudinally thereof by a carriage assembly generally indicated at 140, which consists of a bracket 142 secured to the top edge of the bulkhead 42, and a yoke 144 pivotally connected to the bracket 142 and carrying rollers 146 which are supported on and adapted to roll along the roller tracks 98 of the trolley beam 38. In the preferred embodiment illustrated, as shown in FIGURE 12, the cylindrical rollers 146 are mounted on ball bearings 148. The yoke 144 has a central portion 150 which extends below and transversely of the trolley beam 38 and has spaced vertical arms 152 which support inwardly extending horizontal shafts 154 upon which the rollers 146 are mounted. As can clearly be seen in FIGURE 13, each arm 152 of the yoke 144 carries a pair of horizontally spaced rollers 146 and accordingly, it will be appreciated that the weight of the bulkhead 42 is distributed between four rollers 146 supported on and rolling along the tracks 98. The central portion 150 of the yoke has a stepped central aperture 156 in which is received a shoulder bolt 158 having a head 160 and a cylindrical shaft portion 162 which are received in the stepped aperture 156 and having a threaded lower end portion 164.

The bracket 142 is generally C-shaped and includes a base portion 166 which is secured to the top edge of the bulkhead 42 by a plurality of bolts 168. The bracket 142 also includes a generally vertical portion 170 which is offset from the center line of the bulkhead 42 so that it is disposed adjacent but spaced inwardly of one face of the bulkhead 42. The bracket 142 also includes a horizontal supporting arm 172 which is provided with a central tapped opening 174 which receives the threaded lower end 164 of the bolt 158. To securely hold the bolt 158 against becoming unscrewed from the bracket 142, the threaded lower end 164 is preferably welded to the bracket arm 172, as indicated at 176. To facilitate the making of this weld, the base portion 166 of the bracket 142 is provided with a central aperture 178 aligned with the aperture 174. To insure ease of turning of the bulkhead 42 and the bracket 142 connected to the upper edge thereof, relative to the yoke 144, a thrust washer 180 is provided between the head 160 of the bolt 156 and the yoke 144.

Referring to FIGURE 5, it will be seen that the above described construction of the carriage means 140 for supporting the bulkhead 42 on the trolley beam 38 has the important advantage of enabling the bulkhead 42 to be positioned closely adjacent the side wall or, as illustrated in this figure, the door 182. It will be seen that when the bulkhead is disposed parallel to the side wall (or door) and moved closely adjacent thereto, the plate 66 of the crane rail 36 extends into the C-shaped bracket 142 between the base portion 166 and the upper horizontal supporting arm 172 thereof.

As previously indicated, the pins 48 at the lower corners of the bulkhead 42 engage in floor plates generally indicated at 52 and 54. These floor plates extend along in parallel and closely spaced relation to the opposite sides 12 and 14 of the car and only one of these floor plate assemblies need be described in detail. The floor plate 52 is illustrated in detail in FIGURES 14, 15 and 16. Since the center floor plate 56 differs slightly from the side floor plates 52 and 54, the construction of this center floor plate 56 is illustrated in FIGURE 17.

Figure 16:
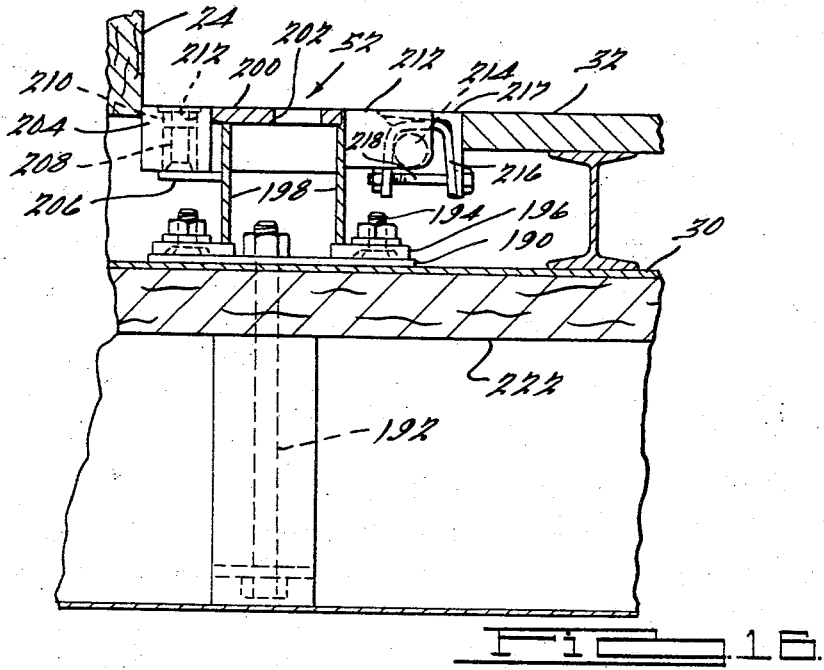
FIGURE 16 is a transverse sectional view of the structure illustrated in FIGURE 14 taken substantially along the line 16—16 thereof.
Figure 17:
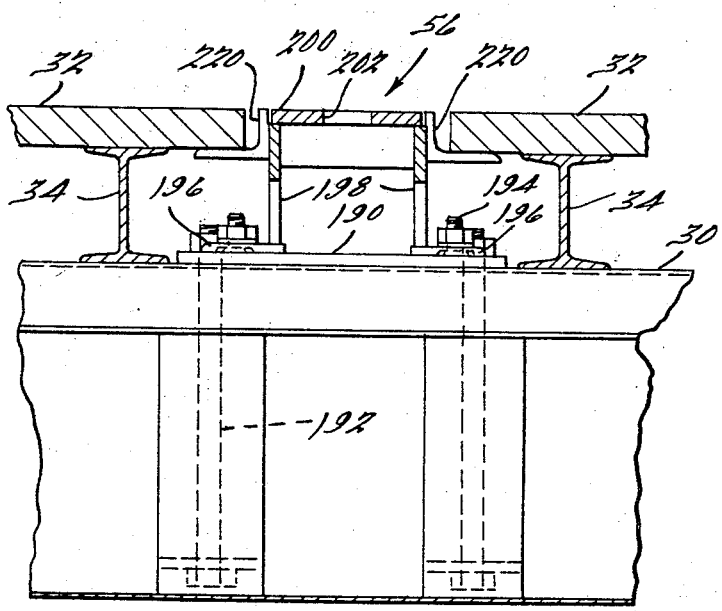
FIGURE 17 is a broken enlarged transverse sectional view of the central floor plate assembly illustrated in FIGURE 1.

Referring to FIGURES 14, 15 and 16, the present invention contemplates the modification of the generally conventional refrigerator car floor construction there illustrated, by cutting away a portion of the conventional rack floor construction 32 adjacent the inner face of the inner car lining 24 to permit the mounting of the floor plate structure 52. This structure includes a plurality of anchor plates 190 which are secured in place on the upper surface of the floor plate 30 by anchor bolts 192. These anchor plates 190 carry upwardly extending studs 194 welded to the upper surface thereof which extend upwardly through feet plates 196 which extend laterally outwardly at the bottom of the generally channel shaped floor plates 52. In the preferred embodiment illustrated, these floor plates 52 are of a fabricated construction disposed with the open side of the channel opening downwardly as clearly illustrated in FIGURE 16 and include spaced parallel vertically disposed leg plates 198 extending upwardly from the feet 196 and carrying a horizontally disposed heavier gauge plate 200, the upper surface of which is flush with the upper surface of the rack floor 32. This plate 200 is provided with a plurality of apertures 202 uniformly spaced longitudinally thereof for receiving the pins carried at the lower edge of the bulkhead 42.

The space between the plate 200 and the adjacent side wall lining 24 is filled by a wooden floor strip 204 which is supported at a plurality of points spaced along the floor plate 52 by support plates 206. The various plates constituting the feet 196, the legs 198 and the horizontal pin receiving plate 200 are welded together and the support plate 206 is also welded to the side plate 198. The wood floor strip 204 is secured to the support plate 206 by a stud 208 extending upwardly from and welded to the upper surface of the support plate 206 and a nut member 210 threadedly received on the upper end of the stud and received in a counterbore 212 provided in the upper surface of the wood strip 204. At the opposite side of the floor plate structure 52, that is secured to the leg 198 which is remote from the side wall lining 24, there is, at a plurality of points spaced along the floor plate structure 52 a hinge structure consisting of a pair of plates 212 extending laterally outwardly from the leg 198 and spaced longitudinally thereof and interconnected by a hinge bar 214 extending therebetween and welded thereto. These hinge bars 214 provide a pivotal support for the rack floor 32 which is connected thereto by strap hinges 216 (see FIGURE 16) to permit the section of the rack floor 32 between the side floor plate structure 52 and the center floor plate structure 56 to be hinged upwardly to permit access to the space below it for cleaning purposes. As illustrated in FIGURE 16, the strap 216 is U-shaped and fits over the hinge bar 214. In the construction illustrated this strap 216 is welded to a supporting angle 217 mounted on the adjacent edge of the rack floor 32 and the open side of the U-shaped strap 216 is closed by a bolt 218 which may be removed if it is desired to completely remove the floor section 32.

The center floor plate structure generally indicated at 56 is similar to the floor side plate structures 52 and 54. It includes a plurality of longitudinally spaced anchor plates 190 secured in place by anchor bolts 192 and carrying studs 194 welded to and extending upwardly from the upper surface thereof and through laterally outwardly extending plates 196 constituting the feet of the channel shaped floor plate structure 56 which again includes leg plates 198 and an interconnecting horizontally disposed plate 200 also provided with longitudinally spaced apertures 202. It will be noted that in the floor plate structure 56 the apertures 202 are centrally located whereas in the floor plate structures 52 and 54 the pin receiving apertures 202 are, in the construction illustrated, offset from the center of the plate 200. The central floor plate structure 56 includes a pair of angles 220 secured to the opposite sides thereof and adapted to support the inner edge of the floor racks 32.

The conventional refrigerator car floor structure illustrated and indicated generally at 16, in addition to the movable rack floor sections 32 and the floor plate 30, also includes a wood floor structure 222 immediately below the floor plate 30. It will be appreciated from a complete understanding of the present invention that the major loads imposed upon the floor plate structures 52, 54 and 56 are horizontal and are imposed, for example, in bumping of the car as during starting, stopping and switching of the car. At such times the load tends to shift against the bulkhead and movement thereof is resisted by the pins 48 and 50 which extend into the apertures 202 in the floor plate structures. To co-operate with the anchor bolts 192 in holding the anchor plates 190 against horizontal movement during such shock loads, a plurality of shear screws 224 are provided which extend downwardly through the feet 196, the anchor plates 190, the floor plate 30 and into the wood floor structure 222. This is best illustrated in FIGURES 14 and 16 which show the side floor plate structure 52. It will, however, be appreciated that shear screws 224 are also employed in the central floor plate structure 56 and the other side floor plate structure 54.

The construction of the bulkhead 42 is best illustrated in FIGURES 18 to 24, inclusive. In the preferred embodiment illustrated, to keep the weight of the bulkhead 42 to a minimum, a framework of aluminum tubing of square cross section is employed and is covered at the opposite faces of the bulkhead with sheet aluminum. The above mentioned framework includes a pair of vertical parallel frame elements 230 interconnected at their top by a horizontal tubular aluminum frame member 232 and interconnected at their lower ends by a horizontal aluminum tubular frame member 234. At the center of the bulkhead are a pair of vertical frame members 236 extending between the upper and lower frame elements 232 and 234 and spaced apart as best illustrated in FIGURE 18.

At opposite sides of the bulkhead are diagonally extending frame members 238 having their upper ends connected to the top frame member 232 adjacent the side frame members 232 and having their lower ends connected to the bottom frame member 234 adjacent one of the central frame members 236. Also, each side of the bulkhead includes a horizontally disposed upper frame brace 240 extending between and connected to a central frame member 236 and the diagonal 238 and a second short horizontally disposed frame brace 242 aligned with the brace 240 and extending between and connected to the diagonal 238 and the side frame member 230. Each side of the bulkhead also includes a horizontally disposed lower frame brace 244 spaced above the lower frame member 234 and extending between and connected to the diagonal 238 and the side frame member 230. Each of the frame members above mentioned is, in the preferred embodiment illustrated, formed of extruded aluminum tubing of square cross section and the connections between the frame members are made by welding. The bulkhead framework also includes the following additional frame elements which are formed of extruded aluminum tubing of rectangular cross section having a greater dimension equal to the dimension of the above mentioned frame members of square cross section and having a lesser dimension equal to approximately one-half that of the greater dimension. These additional frame elements provide additional reinforcement and strength to the bulkhead frame and include frame elements 246 extending along and welded to the side frame elements 230 between the upper braces 242 and the lower braces 244 and diagonal bracing elements 248 extending along and welded to the inner side of the diagonal frame members 238 from a point below the upper frame braces 240 to a point below the lower frame braces 244. Each side of the bulkhead also includes a vertically disposed frame brace element 250 spaced outwardly of the central frame member 236 and extending between and connected to the top frame member 232 and upper frame brace 240. Each side also has a horizontal frame brace element 252 spaced below the upper brace 240 and extending between and connected to the central frame member 236 and the reinforcing frame element 248 extending along and welded to the diagonal 238.

Another horizontal frame brace element 254 is aligned with the element 252 and extends between the diagonal 238 and the reinforcing element 246 welded to the side frame member 230. Each side of the bulkhead also includes two additional vertical parallel bracing elements 256 which extend between the lower frame member 234 and the lower frame brace member 244. Each face of the frame structure is covered by a pair of spaced sheets of aluminum 258 and a central sheet or strip of aluminum 260, all of which are suitably secured to the frame members as by spot welding, puddle welding, screws, rivets, or the like.

As illustrated in FIGURES 18 and 19, the bulkhead includes at each side thereof an opening extending therethrough provided with a hand grip bar 262 which may be readily grasped by a worker from either side of the bulkhead to assist in moving the bulkhead into place. In the construction illustrated, this hand opening is disposed above the horizontal frame brace element 254 adjacent the diagonal 238.

Figure 26:
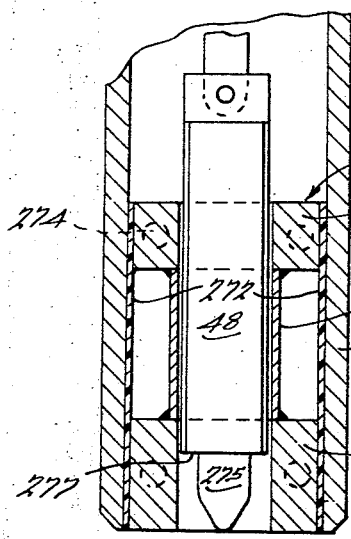
FIGURE 26 is a broken vertical sectional view of the structure illustrated in FIGURE 25 taken substantially along the line 26—26 thereof.
Figure 25:
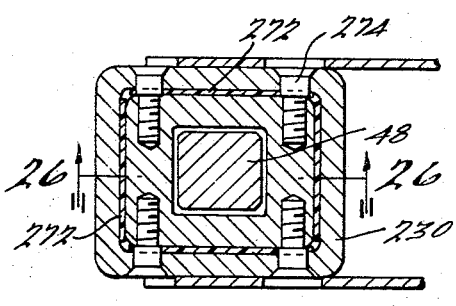
FIGURE 25 is a broken enlarged horizontal sectional view of the structure illustrated in FIGURE 20 taken substantially along the line 25—25 thereof.

The corner pins 48 are mounted in the opposite ends of the vertical frame members 230 and are operated through linkage disposed within the frame members 234 and best illustrated in FIGURES 20 and 22. The pins 48 at each corner of the bulkhead 42 are mounted for vertical sliding movement in a guide block assembly, best illustrated in FIGURES 25 and 26, and generally indicated at 264. Each guide block assembly consists of an outer guide block 266 and an inner guide block 268 spaced from the outer guide block 266 and connected thereto by a guide sleeve 270 which may be welded at its ends to each of the guide blocks 266 and 268. The pins 48 and the parts 266, 268 and 270 of the guide block assembly are preferably formed of steel and are held out of contact with the aluminum frame member 230 within which they are disposed by suitable plastic shims 272 to prevent electrolytic action. Each guide block assembly 264 is securely held in place by eight screws 274 which extend through the sides of the frame member 230 and the shims 272 and into the guide blocks 266 and 268 as illustrated. The heads of these screws are flush with the outer surface of the frame member 230 to avoid interference with the facing sheets 258 and 260. The center pin is also mounted in a guide block assembly 264 which in this case extends upwardly through the bottom frame member 234 and into the space between the closely spaced parallel central frame members 236. The pins 48 are rectangular in cross section as shown in FIGURE 25 and are freely slidable within the guide block assembly 264. As shown in FIGURE 26, the pins 48 have a reduced circular outer end 275 adapted to be received in the floor plate apertures 202.

The handle 46 which, as mentioned earlier, operates all of the pins 48 and 50 is connected at its inner end to a horizontal main operating shaft 276 which extends through and is rotatably supported in suitable bearings 278 mounted in the frame brace elements 246. The opposite ends of the shaft 276 are disposed within the side frame members 230 and carry crank elements 280 fixed thereon. The linkage within the side frame members 230 for operating each of the corner pins 48 is substantially identical and each includes a link 282 having one end pivotally connected to the crank 280 and having its other end pivotally connected to a short lever 284 near the center thereof. As illustrated in FIGURES 20 and 22, one end of the short lever 284 is pivotally connected to a bracket 286 fixed within the frame member 230 as by rivets 288. The other end of the short lever 284 is pivotally connected to one end of a link 290, the other end of which is pivotally connected to the inner end of the pin 48. In order to provide the necessary adjustment of the linkage, each of the links 290 includes a conventional means indicated at 292 for adjusting its length. At the opposite edges of the bulkhead 42 the outer walls of the vertical frame members 230 are provided with elongated openings 293 providing access to the interior of the frame member 230 for necessary work on or adjustments of the linkage housed therein. The center pin 50 is operated by a crank 294 which is fixed on the main shaft 276 adjacent the connection of the handle 46 thereto in the space between the central frame members 236. This crank 294 operates the central pin 50 through a linkage generally indicated at 296 which is similar to that above described through which the crank 280 is connected to and operates the pins 48. The linkage 296 also includes a conventional means indicated at 298 for adjusting the length thereof.

At each face of the bulkhead 42 the center aluminum sheet 260 has an opening 299 therein permitting access to the handle 46 from either side of the bulkhead and permitting the handle to be swung outwardly in either direction. The above described connections between the handle 46 and the pins 48 and 50 are so adjusted that with the handle 46 in the position illustrated in FIGURES 2 and 18, in which it is disposed completely within the bulkhead, all of the pins 48 and 50 are in an extended position and the weight of the bulkhead is at least partially supported on the lower pins 48, which, as best shown in FIGURE 26, are provided with a downwardly facing shoulder 277 which, when the handle 46 is in the position illustrated in the drawings, engages and is supported on the upper surface of the floor plate structure, around the aperture 202 in which the pin end 275 is received. In the preferred embodiment illustrated, when the handle 46 is at right angles to the face of the bulkhead 42 all of the pins 48 and 50 are in their retracted positions and withdrawn into the bulkhead. The construction, arrangement and adjustment of the above described linkage is preferably such that upon movement of the handle 46 downwardly toward the position illustrated in the drawings from the above mentioned position at right angles to the bulkhead, the center pin 50 moves outwardly ahead of the corner pins and may be engaged in one of the floor plate apertures 202 to provide an axis about which the bulkhead may be pivotally moved prior to outward movement of the corner pins 48 sufficiently to engage either the floor plates or the crane rail plates 66. Upon continued movement of the handle 46 toward the position illustrated in which it is disposed in the plane of and within the bulkhead 42, the lower corner pins 48 are moved into the apertures 202 in the floor plates and the upper corner pins 48 are moved into the apertures 68 in the crane rail plates 66. The final movement of the handle 46 to this position raises the bulkhead slightly, thereby relieving the load otherwise transmitted through the carriage assembly 140 to the trolley beam 38. The position assumed by the parts under this condition, exaggerated for purposes of illustration, is clearly shown in FIGURE 11 in which it will be noted that the rollers 146 of the carriage assembly 140 are raised off of the roller track 98 of the trolley beam 38.

Referring to FIGURES 21, 23 and 24, the handle which is generally indicated at 46 includes a short inner end section 300 which is apertured to receive a square section 302 of the cross shaft 276 to positively connect the handle 46 to the shaft 276 for rotation therewith. The handle also includes an outer end section 304 which is pivotally connected to the inner end section 300 by a pivot pin 306 which extends at right angles to the shaft 276. It will be appreciated that the reason for forming the handle 46 in the two sections 300 and 304 is to enable use of the handle when the space at the accessible side of the bulkhead is insufficient to permit normal operation of the handle with its full length extending at right angles to the bulkhead. Because of the pivotal connection provided by the pin 306, the outer section 304 may be turned to the degree required by the space limitations and still permit operation of the handle to extend and retract the pins 48 and 50. This enables the operator to load both ends of the car and position and lock the bulkheads although the final space between them may be of the order of one foot. In the preferred embodiment illustrated the outer handle section 304 includes a spring pressed detent or pin 308. (See FIGURES 23 and 24.) At its outer or lower end mounted in the bulkhead 42 at the bottom of the opening 299 is a short horizontal bar section 310 having a central slot 312 disposed at the center of the bulkhead and in the convex outer surface 314 of the bar section. With this construction it will be seen that as the handle 46 is pushed into the position shown in FIGURE 24, the pin 308 will ride up the convex surface 314 at one side of the slot 312 and drop into the slot 312 as the handle reaches the position illustrated. The pin 308 is yieldably urged to the extended position illustrated by a spring 316 encircling the pin 308 and one end of which engages a fixed abutment 318 secured in the outer handle section 304 by screws 320, and the other end of which engages an abutment 322 fixed on and movable with the pin 308. Outward movement of the pin 308 under the influence of the spring 316 is limited by a transverse pin 324 extending through a transverse hole in the inner end of the pin 308 and engaging the inner side of the abutment 318 in the extended position of the pin 308. The outer section 304 of the handle 46 is provided with openings 328 permitting access to the interior of the outer section 304 so that one may insert his fingers therethrough and engage the channel shaped movable abutment 322 to retract the pin 308 against the pressure of the spring 316. In the embodiment illustrated in FIGURES 23 and 24 pivotal movement of the outer handle section 304 relative to the inner handle section 300 about the pivot pin 306 is yieldably resisted by a friction element 328 mounted in the inner handle section 300 and pressed against the outer handle section 304 by a set screw 330.

It is an important feature of the present invention that, as shown in FIGURES 3 and 33, the refrigerator car floor 16 is provided adjacent each dorway opening with auxiliary floor plates 400 adapted to receive the locking pins 48 and 50 at the bottom of the bulkhead. Since these auxiliary plates are not used to support the bulkhead when it is bracing freight and hence do not carry large loads they may be constructed and mounted as shown in FIGURE 33. Each auxiliary plate 400 is a flat strip having a plurality of apertures 402 uniformly spaced therealong which are similar to the apertures 202 and adapted to receive the lower ends of the pins 48 and 50 at the bottom of the bulkhead. These plates extend longitudinally of the car and are disposed parallel to and in closely spaced relation to the adjacent one of the side floor plate structures 52 and 54. As shown in FIGURE 3 there are three of these plates 400 at each side of the car and they are spaced to receive and support the ends of the pins 48 and 50 at the bottom of the bulkhead. The plates 400 are received in recesses 404 provided in the rack floor 32 and secured in place by a plurality of screws 406.

The above described construction enables the bulkheads 42 and 44 to be stored across one doorway of the car while leaving the opposite doorway and both ends of the car unobstructed for loading the car. During transporting of the car when empty the bulkheads 42 and 44 are preferably disposed transversely of the car as shown in FIGURE 1 or against a side of the car as shown in FIGURE 2 so that all four corner pins 48, as well as the center pin 50 will be operative to support the bulkheads against movement longitudinally of the car and so that the pins 48 and 50 at the bottom of the bulkheads will be supported by the stronger and better anchored floor plate structures 52, 54 and 56 rather than by the auxiliary floor plates 400.

When it is desired to load a car equipped with the freight bracing apparatus of the present invention, the bulkheads 42 and 44 are first moved from their empty car transport positions, such as shown in FIGURES 1 and 2, to the positions illustrated in FIGURE 3 in which they are disposed across the doorway opening which will not be used in loading the car. The handle 46 is first pivoted outwardly to a position at right angles to the face of the bulkhead. The initial portion of this movement, in retracting the lower corner pins 48 lowers the bulkhead so that it is completely supported on its trolley beam 38 or 40 by the engagement of the bulkhead carriage rollers 146 with the roller track flanges 98 of the trolley beam. The completion of the movement of handle 46 retracts all of the pins 48 and 50. The bulkhead is now free to move transversely of the car as the rollers 146 roll along the trolley beam flanges 98. The bulkhead may also now be moved longitudinally of the car as the trolley beam upon which it is supported moves along the crane rails 36. During this movement the trolley beam is held against cocking, that is, is held at right angles to the car by the engagement of the teeth of the trolley beam sprocket wheels 116 in the crane rail apertures 74. It will be appreciated, of course, that when the bulkhead 44 is in the position illustrated in FIGURE 3 the upper ends of the corner pins 48 at the top of the bulkhead are not engaged in any supporting structure. During the movements of the bulkhead the handle 46 serves as a lever facilitating the turning and positioning of the bulkhead.

When the loading of each end is completed, a bulkhead is moved against the load and locked in place by the pins 48 and 50 and, as pointed out above, when finally locked in place, the bulkhead is slightly raised by the bottom corner pins 48 so that during transit of the car the trolley beams are relieved of the load of the bulkheads.

Although the construction illustrated and described above includes the center locking pin 50, it will be appreciated that the construction may be modified to omit the center pin 50, its operating crank 294 and linkage 296, the center floor plate structure 56, and the middle ones of each group of three of the auxiliary floor plates 400.

A modified construction which may be employed for the handle assembly is illustrated in FIGURES 27 and 28. The handle 46' there illustrated similarly includes an inner handle section 300' and an outer handle section 304' and differs from the handle 46 previously described primarily in the means for resisting pivotal movement of the outer handle section 304' relative to the inner handle section 300'. In place of the friction element 328 and the set screw 330 urging it into engagement with the outer handle section 304, the handle assembly 46' includes a rod 332 mounted within the outer handle section 304' and having its outer end welded to a channel shaped guide 334 slidable within the handle section 304'. Its inner end is slidable in a bore 336 provided centrally of a yoke shaped hinge member 338 at the inner end of the handle section 304' which yoke shaped member fits over the tongue 340 of a hinge member 342 at the outer end of the handle section 300'. The tongue 340 is provided with three bores 344, provided in the outer surface thereof and adapted to be aligned with the bore 336. The three bores 344 are angularly spaced and disposed so that when the outer handle section 304' is aligned with the inner handle section 300', the rod 332 may extend into the central one of the bores 344 and when the outer handle section 304' extends at right angles to the handle section 300' the rod 332 may extend into another of the bores 344. In this embodiment the abutment 318', rather than being fixed in the handle section 304', is welded to the movable guide 334 for movement therewith and a suitable pin 346 extends transversely of the handle section 304' in a position to be engaged by the spring abutment 322' to limit movement of the pin 308' outwardly of the handle section 304'. Also, in the handle assembly 46', in addition to the openings 326', through which one may engage the abutment 322' to retract the pin 308', the handle section 304' also is provided with openings 348 through which one may engage the movable guide 334 to withdraw the rod 332 from the one of the bores 344 in which it is received. It will be noted that in this construction the spring 316' acts both to urge the pin 308' outwardly and to urge the rod 332 inwardly into one of the bores 344. With this construction, when the handle is in the straight position with the rod 332 received in the central bore 344, the handle 46' may be used as a lever to turn the bulkhead, whereas in the previously described embodiment when this is attempted, only a limited force may be exerted before the outer handle section 304 will pivot about the pivot pin 306, the force exerted then being sufficient to overcome the frictional force opposing such movement provided by the friction element 328.

FIGURES 29 and 30 show a modified frame structure for the bulkhead adapted to provide substantially increased strength. In these figures only the frame structure is shown and the outer skin or sheets of aluminum are omitted to more clearly show the frame structure. In the modified construction illustrated in these figures the frame structure includes side frame members 230', a top frame member 232' and a bottom frame member 234'. Each of these frame members, as well as the additional frame members provided in the modification illustrated in these figures are preferably formed of extruded aluminum tubing of square cross section, the same as in the frame structure of the previously described bulkhead 42. In the frame structure illustrated in FIGURES 29 and 30 there is provided at the bottom a pyramid of frame members 350, 352 and 354. As illustrated, the frame member 350 extends the full distance between the side frame members 230' and is in abutting relation with the bottom frame member 234'. The frame members 352 and 354 are progressively shorter, the frame member 352 overlying the central portion of the frame member 350 and the frame member 354 overlying the central portion of the frame member 352. Corresponding frame members 350', 352' and 354' are similarly disposed at the top of the bulkhead frame structure. The frame structure also includes additional vertically disposed frame members disposed at equal intervals between the side frame members 230'. The vertical frame members 356 extend between horizontal frame members 350 and 350' at the ends of the horizontal frame members 352 and 352' and the vertical frame members 358 extend between the horizontal frame members 352 and 352' at the ends of the frame members 354 and 354'. The vertical frame members 360 extend between the horizontal frame members 354 and 354'.

In addition to the main frame members above described, the structure illustrated in FIGURE 29 also includes hand grips 262' which are suitably mounted between the frame members 356 and the side frame members 230' and also includes frame elements 362 suitably mounted between the center vertical frame members 360 and defining a space 364 therebetween for the handle 46. FIGURE 29 also illustrates bearing blocks 366 mounted on the inner side of each of the frame members generally centrally thereof and adapted to rotatably support the main horizontal operating shaft 276.

As illustrated in FIGURE 30, the apertures 368 in the vertical frame members are substantially larger than the apertures 370 in the bearing blocks 366, thereby insuring that the support for the shaft 276 will be provided by the bearing blocks 366.

FIGURES 31 and 32 illustrate the installation of a modified floor plate construction in an insulated car as distinguished from the refrigerated car construction illustrated in the embodiment first described. In these figures the conventional wood floor 372 is cut out as indicated at 374 to receive a flat floor plate 54' provided with apertures 202' adapted to receive the lower end portions 275 of the pins 48 and 50 at the lower edge of the bulkhead 42. Aligned with this opening 202' in the plate 54' is a recess 376 to prevent interference between the lower end portions 275 of the pins and the floor 372. To securely hold the plate 54' against movement relative to the floor 372 in response to the heavy load transmitted to the plate 54' by the bulkhead pins, a plurality of anchor elements 378 are provided. These anchor elements are generally cylindrical in shape but have an outwardly flared conical upper end portion 380 adapted to seat on a similarly shaped conical surface 382 provided in the upper portion of an aperture 384 provided in the floor plate 54' and adapted to receive the anchor element 378. Each of the anchor elements 378 is securely held in place by a screw 386 extending centrally through the anchor element 378 and threaded into the wood floor 372. The cylindrical anchor element 378 extends substantially below the plate 54' and into a recess 388 provided in the floor 372. It will thus be appreciated that these anchor elements 378 provided a large area engagement with the wood floor 372 for resisting movement of the floor plate 54' relative to the floor 372. Except for the provision of the floor plate 54' and the recessing of the floor 372 to receive this plate and the anchor elements 378 and screws 386, the remainder of the insulated car construction illustrated in FIGURE 31 is conventional and forms no part of the present invention and accordingly, is not described herein.

While only certain specific embodiments of the invention have been illustrated and described in detail herein, it will be readily appreciated by those skilled in the art that numerous modifications and changes may be made therein without departing from the spirit of the present invention.

What is claimed is:

1. In a freight carrying vehicle having a floor and opposed side walls, a bulkhead movable between a plurality of selected positions within said vehicle, locking pins carried by said bulkhead at the top and bottom thereof, rail members mounted on and extending longitudinally of said vehicle adjacent the top of said bulkhead, a trolley beam, said rails supporting the opposite ends of said trolley beam for movement longitudinally of said vehicle, said rails also having means spaced therealong for cooperation with the ones of said locking pins at the top of said bulkhead for holding said bulkhead in said positions, and carriage means supporting said bulkhead on said trolley beam and bodily movable longitudinally of said beam for moving said bulkhead longitudinally of and parallel to said beam, said trolley beam including a roller track extending longitudinally thereof, said carriage means including rollers engaging said track and supporting said carriage means on said beam for rolling movement therealong, said means on said rails comprising horizontally disposed flanges extending inwardly into said vehicle from adjacent each of said side walls and said carriage means including a C-shaped bracket secured to said bulkhead and adapted to fit over said flanges to enable said bulkhead to be disposed under said flanges in positions parallel and closely adjacent to each of said side walls.

2. The combination defined in claim 1 wherein said C-shaped bracket includes a lower generally horizontal arm secured to the top of said bulkhead and a generally vertically extending support section offset horizontally from the center of said bulkhead.

3. In a freight carrying vehicle having a floor and opposed side walls, a bulkhead adapted to extend transversely of said vehicle to brace freight and having vertically extending pins at the upper corners thereof movable upwardly for use in securing said bulkhead in desired adjusted positions, rail members mounted on and extending longitudinally of said vehicle adjacent the top of said bulkhead and each including a plate portion extending inwardly from the adjacent wall above said bulkhead and having apertures adapted to selectively receive said pins at the upper corners of said bulkhead, each of said rail members also having a track extending longitudinally of said vehicle, a header extending transversely of said vehicle and adapted to support said bulkhead, co-operating means on the opposite ends of said header and on said rail member tracks mounting said header on said rail members for movement longitudinally of said vehicle, other co-operating means on said header and on said bulkhead mounting said bulkhead on said header for rotary movement relative thereto and for movement longitudinally of said header, said last named means including a C-shaped bracket secured to said bulkhead and adapted to receive said plate portion to permit said bulkhead to be disposed in a position in which it is closely adjacent either one of said side walls when said bulkhead extends longitudinally of said vehicle and has been moved longitudinally of said header to one limit of its travel relative thereto.

4. A rail assembly for a freight bracing apparatus for a freight carrying vehicle, said rail assembly being of generally uniform cross section throughout its length and including an upper section adapted to be secured to said vehicle to support said rail assembly thereon, said rail assembly also including a lower horizontally extending section having a plurality of apertures spaced along the outer portion thereof adapted to receive co-operating locking pins forming a part of said freight bracing apparatus, an angle extending along and welded to said upper and lower sections and co-operating therewith to provide a box cross section, said angle having a vertical flange extending at right angles to said lower section with its lower edge welded thereto inwardly of said apertures therein and having a horizontal flange extending in spaced parallel relation to said lower section and having its edge welded to said upper section, said horizontal flange having a plurality of apertures uniformly spaced therealong and being adapted to provide a supporting track for a sprocket wheel forming a part of said freight bracing apparatus.

5. A fabricated rail assembly for a freight bracing apparatus for a freight carrying vehicle comprising an elongated C-shaped channel formed of relatively thin material and including a lower horizontal leg, a horizontal anchor plate overlying said lower leg and secured to said channel, said plate having an outer portion extending beyond said lower leg and having a plurality of apertures extending vertically therethrough and spaced longitudinally thereof, an angle disposed with one leg extending vertically upwardly from said plate inwardly of said apertures and welded to said plate and having its other leg extending horizontally in spaced parallel relation to said plate and having its edge welded to said channel so that said angle co-operates with said plate and said channel to provide a box cross section, said horizontal leg of said angle having a plurality of apertures closely and uniformly spaced therealong.

6. A trolley beam for a freight bracing apparatus including a pair of horizontally spaced and parallel supporting rails each having a sprocket wheel track extending longitudinally thereof, said trolley beam comprising an elongated rectangular metal tube, an elongated metal plate overlying and secured to the top of said tube and having outer marginal portions extending laterally beyond said tube, an angle at each side of said tube having one leg extending along and secured to the side wall of said tube and having its other leg extending outwardly at right angles to said tube in spaced parallel relation to said marginal portions of said plate and adapted to co-operate therewith to receive rollers therebetween and provide a trackway therefor, sprocket wheels at opposite ends of said beam, and adapted to be supported on and roll along said sprocket wheel tracks, means mounting said sprocket wheels on said beam for rotation relative thereto and for axial movement relative to each other and interconnecting said sprocket wheels to hold said sprocket wheels against rotation relative to each other, said last named means including a tubular shaft extending through said tube, self-centering bearings at opposite end of said tube supporting said shaft against axial movement relative thereto and for rotation relative thereto, means rigidly connecting one of said sprocket wheels to one end of said shaft and means connecting the other of said sprocket wheels to the other end of said shaft for rotation therewith and for axial movement relative thereto.

7. In a freight bracing apparatus a frame structure for a bulkhead adapted to engage and support freight, said frame structure comprising top, bottom and side frame members rigidly secured together, a lower pyramid structure comprising a plurality of horizontal frame members stacked with their centers one above the other and of progressively decreasing lengths, means rigidly securing said members of said pyramid structure together and to said bottom frame member, and a plurality of spaced frame members parallel to said side frame members and secured to the members of said pyramid structure, all of said frame members being disposed in the same plane, an upper and inverted pyramid structure comprising a plurality of horizontal frame members stacked downwardly from said top frame member and with their centers one below the other and of progressively decreasing lengths, and means rigidly securing said frame members of said upper pyramid structure together and to said top frame member, corresponding frame members of said upper and lower pyramid structure being of the same lengths and said members parallel to said side members being substantially equally spaced.

8. In a freight carrying vehicle having a floor and opposed side walls, a bulkhead adapted to extend transversely of said vehicle and substantially completely across said vehicle to brace freight, said bulkhead having means for holding it in desired positions relative to said vehicle and including vertically extending pins at the lower edge thereof at the corners and at the center thereof, co-operating means supported on said side walls supporting said bulkhead on said side walls for movement longitudinally and transversely of said vehicle and for rotary movement between positions transversely of said vehicle and positions parallel to said side walls, floor anchor plates mounted on and extending longitudinally of said floor and having apertures therein for receiving said pins to support said bulkhead in a plurality of positions spaced longitudinally of said vehicle, and means for moving said pins into and out of engagement with said floor plates, said last named means including a handle mounted on said bulkhead and movable between locked and unlocked positions and means operatively connecting said handle to said pins and effective upon movement from said unlocked position toward said locked position to move said center pin into an aperture of the center floor anchor plate before the corner pins are moved into the apertures of their anchor plates whereby the center pin may be used as a pivot pin during pivoting of the bulkhead relative to the vehicle.

References Cited by the Examiner

UNITED STATES PATENTS

| | | | |
|---|---|---|---|
| 934,933 | 9/09 | Posson | 292—218 |
| 1,092,014 | 3/14 | Briggs | 287—99 |
| 1,631,127 | 6/27 | Haseltine | 292—218 |
| 1,991,818 | 2/35 | Nissen | 105—150 |
| 2,121,288 | 6/38 | Gilpin | 105—410 |
| 2,155,463 | 4/39 | Angell | 105—376 |
| 2,160,870 | 6/39 | Jones | 105—376 |
| 2,220,436 | 11/40 | Ziegler | 105—376 |
| 2,360,029 | 10/44 | Wieden | 105—376 |
| 2,414,160 | 1/47 | Moon | 105—369 |
| 2,482,855 | 9/49 | Lloyd | 105—150 |
| 2,543,143 | 2/51 | Wells et al. | 105—376 |
| 2,752,864 | 7/56 | McDougal et al. | 105—376 |
| 2,866,419 | 12/58 | Candlin | 105—376 |
| 2,875,707 | 3/59 | MacDonnell | 105—376 |
| 2,905,107 | 9/59 | Nichol | 105—369 |
| 2,911,925 | 11/59 | Adler et al. | 105—376 |
| 3,017,842 | 1/62 | Nampa | 105—376 |
| 3,017,843 | 1/62 | Loomis et al. | 105—376 |
| 3,018,741 | 1/62 | Loomis et al. | 105—376 |

MILTON BUCHLER, *Primary Examiner.*

JAMES S. SHANK, LEO QUACKENBUSH, EUGENE G. BOTZ, *Examiners.*